(12) United States Patent
Seo et al.

(10) Patent No.: US 12,458,610 B2
(45) Date of Patent: Nov. 4, 2025

(54) PHARMACEUTICAL COMPOSITION FOR TREATING OR PREVENTING DIABETIC CATARACT

(71) Applicant: KOREA UNIVERSITY RESEARCH AND BUSINESS FOUNDATION, Seoul (KR)

(72) Inventors: Hong Seog Seo, Seoul (KR); Yong Jik Lee, Incheon (KR); Jong-Suk Song, Seoul (KR); Youngsub Eom, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 752 days.

(21) Appl. No.: 17/421,826

(22) PCT Filed: Jan. 10, 2020

(86) PCT No.: PCT/KR2020/000479
§ 371 (c)(1),
(2) Date: Jul. 9, 2021

(87) PCT Pub. No.: WO2020/145728
PCT Pub. Date: Jul. 16, 2020

(65) Prior Publication Data
US 2022/0096403 A1  Mar. 31, 2022

(30) Foreign Application Priority Data
Jan. 10, 2019 (KR) .......... 10-2019-0003369

(51) Int. Cl.
A61K 31/165 (2006.01)
A61P 27/12 (2006.01)

(52) U.S. Cl.
CPC .......... *A61K 31/165* (2013.01); *A61P 27/12* (2018.01)

(58) Field of Classification Search
CPC ...... A61K 31/165; A61K 9/0048; A61K 9/08; A61K 9/127; A61P 27/12; A23L 33/10; A23V 2002/00
See application file for complete search history.

(56) References Cited

U.S. PATENT DOCUMENTS

| 2006/0110428 A1 | 5/2006 | deJuan et al. |
| 2011/0091459 A1 | 4/2011 | Gant et al. |
| 2018/0289643 A1 | 10/2018 | Seo et al. |

FOREIGN PATENT DOCUMENTS

| CN | 103140217 A | * | 6/2013 | ............. A61K 31/00 |
| JP | 9-136831 A | | 5/1997 | |
| JP | 2003-528909 A | | 9/2003 | |
| KR | 10-1692680 B1 | | 1/2017 | |

(Continued)

OTHER PUBLICATIONS

Obrosova et al, "Diabetic cataracts: mechanisms and management", Diabetes Metab Res Rev, 2010, 26, pp. 172-180. (Year: 2010).*

(Continued)

*Primary Examiner* — Marianne C Seidel
*Assistant Examiner* — Joshua A Atkinson
(74) *Attorney, Agent, or Firm* — NSIP Law

(57) ABSTRACT

The present disclosure relates to a pharmaceutical composition for treating or preventing diabetic cataract, which contains midodrine or a pharmaceutically acceptable salt thereof as an active ingredient.

12 Claims, 12 Drawing Sheets

(56) References Cited

FOREIGN PATENT DOCUMENTS

| KR | 1692680 B1 | * | 1/2017 | ............. | A23L 33/00 |
| KR | 20170037557 A | * | 4/2017 | | |
| WO | WO 2018/074879 A1 | | 4/2018 | | |
| WO | WO-2018064354 A1 | * | 4/2018 | ......... | A61K 31/4725 |

OTHER PUBLICATIONS

Hamid et al, "Relationship of cytokines and AGE products in diabetic and non-diabetic patients with cataract", Int Jour Health Sci, 2016, vol. 10, No. 4, pp. 507-115. (Year: 2016).*
KR 20170037557 A English translation (Year: 2017).*
Han, Yao, et al. "Experimental Study of the Therapeutic Effect of Rosiglitazone on Cataract in Type 2 Diabetic Model Rats" *Journal of Hebei Medical University*, Mar. 2005, (5 pages in Chinese, Abstract in English).
International Search Report issued on May 25, 2020 in counterpart International Patent Application No. PCT/KR2020/000479 (3 pages in English and 3 pages in Korean).
Written Opinion issued on May 25, 2020 in counterpart International Patent Application No. PCT/KR2020/000479 (4 pages in Korean).
Zhang, Duzhen, and Man Li. "Puerarin prevents cataract development and progression in diabetic rats through Nrf2/HO-1 signaling." Molecular Medicine Reports 20.2, 2019. (pp. 1017-1024).
Tan, Ava Grace, et al. "Aldose reductase polymorphisms, fasting blood glucose, and age-related cortical cataract." Investigative Ophthalmology & Visual Science 59.11, 2018. (pp. 4755-4762).
Chen, Ying-Ying, et al. "Attenuation of epithelial-mesenchymal transition via SGLT2 inhibition and diabetic cataract suppression by dapagliflozin nanoparticles treatment." Life Sciences 330, Aug. 2023. (pp. 122005: 1-12).
Blaibel, Dania, Cornelius James Fernandez, and Joseph M. Pappachan. "Acute worsening of microvascular complications of diabetes mellitus during rapid glycemic control: The pathobiology and therapeutic implications." World Journal of Diabetes 15.3, Mar. 15, 2024. (pp. 311-317).

* cited by examiner

PHARMACEUTICAL COMPOSITION FOR TREATING OR PREVENTING DIABETIC CATARACT

CROSS REFERENCE TO RELATED APPLICATIONS

This application is a U.S. National Stage Application of International Application No. PCT/KR2020/000479, filed on Jan. 10, 2020, which claims the benefit under 35 USC 119(a) and 365(b) of Korean Patent Application No. 10-2019-0003369, filed on Jan. 10, 2019, in the Korean Intellectual Property Office, the entire disclosure of which is incorporated herein by reference for all purposes.

TECHNICAL FIELD

The present disclosure relates to a composition for treating or preventing diabetic cataract, which contains midodrine or a pharmaceutically acceptable salt thereof as an active ingredient, and a use thereof.

BACKGROUND ART

It is reported that the risk of cataract is about 3-5 times higher in patients with diabetes than in normal people. It is sorbitol that plays the most important role in the onset of cataract in diabetes. The pathogenesis of diabetic cataract is as follows. In diabetes, an excessive amount of glucose is present in tissues. The excess glucose in the tissue is converted to sorbitol by aldose reductase through the polyol pathway. The excess sorbitol existing in the tissue is accumulated also in the cytoplasm of lens fiber cells. The accumulated sorbitol induces osmotic stress by increasing the osmolarity in the cytoplasm of the lens fiber cells. As a result, water is transferred quickly into the cytoplasm to reduce the hyperosmolarity, resulting in cataract due to lens swelling and damage and liquefaction of lens fibers. In addition, the osmotic stress caused by the accumulation of sorbitol induces the apoptosis of lens epithelial cells and also induces endoplasmic reticulum (ER) stress, which lead to cataract by causing damage to lens fibers through oxidative stress by reactive oxygen species.

Cataract, which is an ophthalmic disease characterized by the cloudiness and hardening of the eye lens that lead to a decrease in vision, is the most common cause of blindness worldwide. Cataract may occur due to various causes. Senile cataract occurring with aging is the most common cataract. Cataract is also caused by metabolic disorders such as diabetes.

The prevalence of diabetes is increasing worldwide and, as the life span of diabetic patients is extended due to improved methods for treating diabetes, the number of patients who become blind due to diabetes-associated complications is also increasing gradually. The representative complication associated with diabetes is diabetic retinopathy. Diabetic retinopathy is a complication which induces progressive microangiopathy in the retina of the eye, leading to blindness. Fundus examination should be performed to investigate the onset and development of diabetic retinopathy. For accurate fundus examination, the lens of the patient should be free from cloudiness and the eye medium should be clear. However, cataract occurring in diabetic patients renders the fundus examination difficult due to the cloudiness of the lens, which makes it difficult to accurately investigate the occurrence and development of diabetic retinopathy. In addition, diabetic retinopathy increases the risk of complications such as macular edema after cataract surgery. If macular edema occurs, the desired improvement in vision cannot be achieved even after the cataract surgery. Therefore, if it is possible to prevent the onset of cataract in diabetic patients and to delay the progression thereof, the onset and development of diabetic retinopathy can be detected more easily and accurately, and the risk of surgery-associated complications can be reduced by maintaining the lens transparent, thereby postponing cataract surgery. Accordingly, it is necessary to prevent and treat cataract in patients with diabetes. The inventors of the present disclosure have developed a therapeutic agent for delaying the onset of diabetic cataract.

Midodrine is marketed under the trade names Amatine, ProAmatine, Gutron, etc. Its IUPAC name is (RS)—N-[2-(2,5-dimethoxyphenyl)-2-hydroxyethyl]glycinamide. It is represented by Chemical Formula I.

[Chemical Formula I]

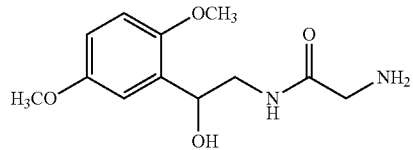

Midodrine is a prodrug which is converted into a target compound in the body after being administered. After being administered, it is converted to an active metabolite, desglymidodrine, which activates $a_1$-adrenergic receptors.

The inventors of the present disclosure have found out that midodrine, which is an $\alpha_1$-adrenergic receptor agonist, is effective in treating and/or preventing diabetic cataract, and have completed the present disclosure.

DISCLOSURE

Technical Problem

The present disclosure is directed to providing a pharmaceutical composition for treating or preventing diabetic cataract.

The present disclosure is also directed to providing a food composition for preventing or improving diabetic cataract.

However, the problems to be solved by the present disclosure are not limited to those mentioned above, and other unmentioned problems may be clearly understood by those of ordinary skill in the art from the following description.

Advantageous Effects

A composition containing midodrine or a pharmaceutically acceptable salt thereof as an active ingredient of the present disclosure can be used for treatment, improvement and/or prevention of diabetic cataract. In addition, the midodrine of the present disclosure may be used as an ophthalmic preparation for treating, improving and/or preventing diabetic cataract.

The composition of the present disclosure can improve the quality of life of a diabetic patient by extending the period in which clear vision can be maintained without cataract and allowing the diagnosis and treatment of diabetic retinopathy through accurate fundus examination.

BEST MODE

Figure 1:
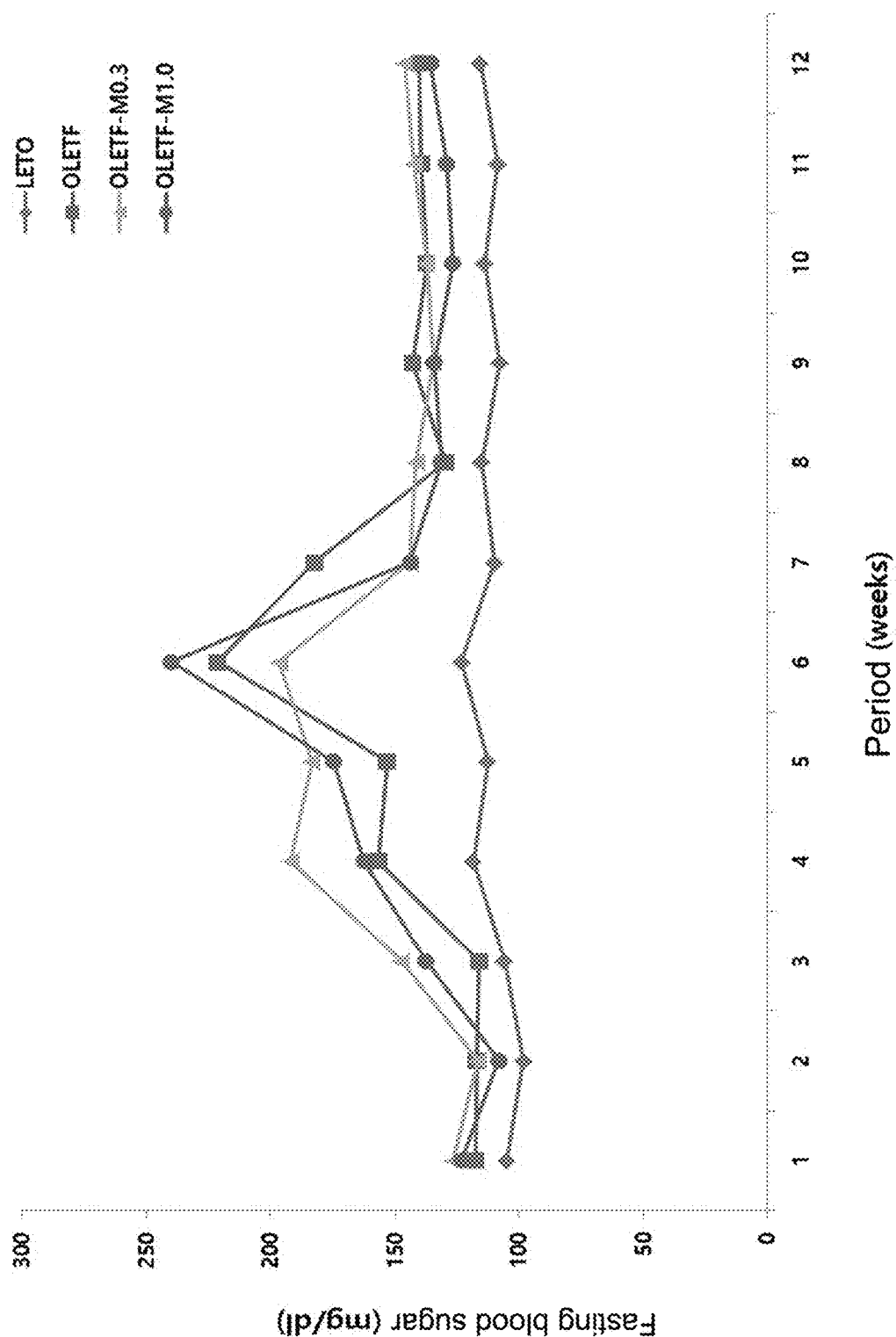
FIG. 1 shows the change in the fasting blood sugar of a diabetes model experimental animal according to an exemplary embodiment of the present disclosure.

The inventors of the present disclosure have identified that the administration of midodrine to a type 2 diabetes animal model maintains lens transparency high and reduces the onset of cataract, and have completed the present disclosure.

Therefore, the present disclosure provides a pharmaceutical composition for treating or preventing diabetic cataract, which contains midodrine or a pharmaceutically acceptable salt thereof as an active ingredient.

In addition, the inventors of the present disclosure have identified that, as a result of measuring the level of aldose reductase, hexokinase, AMPK and ATP in the lens of a type 2 diabetes animal model to which midodrine has been administered, the midodrine-administered animal exhibits decreased expression of aldose reductase as well as increased hexokinase expression and ATP synthesis as compared to a control group.

Accordingly, the midodrine can decrease the expression of aldose reductase and TNFα (tumor necrosis factor-α), can induce the expression of hexokinase and can induce increased synthesis of ATP in cells. Here, the cells may be ocular cells.

In the present disclosure, "prevention" means prevention of the onset of diabetic cataract or delay of the progression of diabetic cataract. In particular, it means prevention of the cloudiness or hardening of the lens of the eye and prevention of worsening of vision by maintaining the lens transparent.

Also, in the present disclosure, "treatment" means recovery of the lens of the eye where diabetes-induced cataract has occurred to a normal level, i.e., a transparent state, or reduction of the extent and degree of cataract.

In addition, the present disclosure may provide a method for preventing or treating diabetic cataract, which includes a step of administering midodrine or a pharmaceutically acceptable salt thereof to a subject. The "subject" may be a mammal including human. Specifically, it may be a mammal having a higher-than-normal blood sugar level, more superficially a diabetic patient, although not being limited thereto.

In another aspect, the present disclosure provides a composition for treating or preventing diabetic cataract, which contains an ophthalmologically effective amount of midodrine and an ophthalmologically acceptable pharmaceutical carrier.

In the present disclosure, the "ophthalmologically effective amount" means an amount of the composition of the present disclosure which is sufficient to reduce cataract or prevent the onset of cataract when administered to an ocular tissue requiring treatment.

The ophthalmologically effective amount may be 0.01-5.0 mg/kg/day.

The pharmaceutical carrier may be an ophthalmologically acceptable buffered saline solution, liposome or biodegradable synthetic polymer, although not being necessarily limited thereto.

For example, intraocular administration may be made with a surgically implantable or injectable intraocular sustained-release device, which may include a biodegradable or non-biodegradable polymer. Specifically, the composition contains a liposome-containing or liposome-free buffered saline solution. In addition, the ophthalmologically acceptable pharmaceutical carrier may include a biodegradable synthetic polymer. The midodrine of the present disclosure may be delivered via sustained intraocular release using a biodegradable polymer. Biodegradable microsphere compositions approved for use in human include polylactides, e.g., poly(lactic acid), poly(glycolic acid) and poly(lactic-co-glycolic acid). Additional biodegradable formulations include, but are not limited to poly(anhydride-co-imide), poly(lactic-glycolic acid), poly(ethyl-2-cyanoacrylate), polycaprolactone, poly(hydroxybutyrate-valerate), poly-orthoester and polyethylene oxide/polypolybutylene terephthalate.

In another specific exemplary embodiment, the composition of the present disclosure includes an eye contact device (e.g., contact lens) impregnated with midodrine. For instance, midodrine can be supplied as tablets and dissolved in the presence of a reusable or disposable contactant in order to impregnate the contactant with a prodrug or a drug. After a suitable incubation time, e.g. 1-6 hours, the contactant is rinsed with an incubation solution and then applied to the eye to permit the midodrine to diffuse from the contactant to the eye. It will also be advantageous to use intraocular sustained-release devices including those described in literatures [Ashton, P. et al., *J. of Occ. Pharm.* 10:691-701 (1994)].

In general, ophthalmic formulations suitable for intraocular administration may be formulated and administered according to the methods known to. Specifically, a formulation that can be oxidized may be may be prepared under an anaerobic environment by keeping the formulation in an inert gas. Specifically, the completed formulation may be stored in an opaque or brown container for protection from light exposure, under an inert atmosphere.

Specifically, aqueous polymer solutions, aqueous suspensions, ointments and gels may be used as topical formulations. The aqueous formulation may also contain a liposome for creating a reservoir of the dissolved therapeutic agent. A particularly preferred formulation is a gel which enhances precorneal retention without the inconvenience and impairment of vision associated with the ointment.

Topical ophthalmic formulations or other topical formulations should generally contain 0.001-10 wt %, specifically 0.05-1 wt %, most specifically 0.05-0.6 wt %, of the therapeutic agent based on the weight of a suitable polymer carrier. Other preferred formulations contain 0.001-0.009 wt % of the therapeutic agent. The amount of midodrine required to reduce cataract is an amount which does not cause appreciable systemic effect from a drug or a prodrug not absorbed by the eye.

Suitable polymer carriers include lightly crosslinked carboxyl-containing polymers (e.g., polycarbonyl), dextran, cellulose derivatives, polyethylene glycol 400 and other polymer demulcents.

A suitable system includes a lightly crosslinked acrylate polymer, etc. well known in the art. In a specific exemplary embodiment, the polymer may be one prepared from about 90 wt % or more, specifically about 95-99.9 wt %, of one or more carboxyl-containing monoethylene-based unsaturated monomer based on the total weight of monomers, but other polymerizable unsaturated carboxyl-containing monomers such as methacrylic acid, ethacrylic acid, β-methylacrylic acid (crotonic acid), cis-α-methylcrotonic acid (angelic acid), trans-α-methylcrotonic acid (tiglic acid), α-butylcrotonic acid, α-phenylacrylic acid, α-benzylacrylic acid, α-cyclohexylacrylic acid, β-phenylacrylic acid (cinnamic acid), coumaric acid (o-hydroxycinnamic acid), embelic acid (p-hydroxycoumaric acid), etc. may be used together with or instead of acrylic acid.

The polymer is crosslinked by using a small amount, e.g., about 0.01-5 wt %, specifically about 0.1-2 wt %, of a multifunctional crosslinking agent based on the total weight of monomers. The crosslinking agent includes a non-polyarenyl polyether bifunctional crosslinking monomer, e.g., divinyl glycol, 2,3-dihydroxhexa-1,5-diene, 2,5-dimethyl-1,5-hexadeone, divinylbenzene, N,N-diallylacrylarnide, N,N-diallymethacrylmaide, etc. In addition, a polyalkenyl polyether crosslinking agent containing an alkenyl ether group having a terminal HC=C— group, prepared from etherification of a polyhydric alcohol containing two or more alkenyl ether groups, specifically two or more alkenyl ether groups, four or more carbon atoms and three or more hydroxyl groups, with allyl bromide, etc., e.g., polyallyl sucrose, polyallylpentaerythritol, etc., is included [U.S. Pat. No. 2,798,053]. A diolefinic, non-hydrophilic macromer crosslinking agent with a molecular weight of about 400-8,000, e.g., a reaction product of a diol and an insoluble diacrylate of a polyol, polyacrylate and methacrylate, or a diisocyanate and hydroxyalkyl acrylate or methacrylate, or a reaction product of a polyester diol or an isocyanate-terminated prepolymer derived from a polyether diol or a polysiloxane diol and a hydroxyalkyl methacrylate, etc. may be used as a crosslinking agent [U.S. Pat. Nos. 4,192,827 and 4,136,250].

The lightly crosslinked polymer may be prepared from a carboxyl-containing monomer, which is a monoethylene-based unsaturated monomer, and a crosslinking agent. It may also be a polymer wherein about 40 wt % or less, specifically about 0-20 wt %, of the carboxyl-containing monoethylene-based unsaturated monomer is substituted with one or more non-carboxyl-containing monoethylene-based unsaturated monomer containing a physiologically and ophtalmologically unharmful substituent, including an acrylic acid or methacrylic acid ester such as methyl methacrylate, ethyl acrylate, butyl acrylate, 2-ethylhexyl acrylate, octyl methacrylate, 2-hydroxymethyl-methacrylate, 3-hydroxypropyl acrylate, etc., vinyl acetate, N-vinylpyrrolidone, etc. More examples of the additional monoethylene-based unsaturated monomer are described in U.S. Pat. No. 4,548,990. Particularly preferred polymers are lightly crosslinked acrylate polymers wherein the crosslinking monomer is 2,3-dihydroxyhexa-1,5-diene or 2,3-dimethylhexa-1,5-diene.

Specifically, the aqueous suspension of the present disclosure may contain about 0.1-6.5 wt %, specifically about 0.5-4.5 wt %, of lightly crosslinked polymer particles based on the total weight of the aqueous suspension. Specifically, it may be prepared using pure sterilized water, specifically deionized water or distilled water, not containing a physiologically and ophtalmologically unharmful ingredient. A physiologically and ophtalmologically acceptable acid, base or buffer for control of pH, e.g., an acid such as acetic acid, boric acid, citric acid, lactic acid, phosphoric acid, hydrochloric acid, etc., a base such as sodium hydroxide, sodium phosphate, sodium borate, sodium citrate, sodium acetate, sodium lactate, tris(hydroxymethyl)aminomethane (THAM), etc., citrate/dextrose, sodium bicarbonate, ammonium chloride and a mixture thereof, may be used to adjust pH to a neutral pH of about 7.0-7.4. The eye, however, will tolerate the pH outside the neutral range and a more acidic or basic pH can be used to facilitate drug dissolution.

The aqueous suspension may be packaged in a preservative-free, non-reclosable single-dose container. This permits a single dose of the medicament to be delivered to the eye in a dropwise manner, and the container is discarded after use. Especially, the container eliminates the potential of preservative-related irritation and sensitization of the corneal epithelium, which have been observed to occur particularly from ophthalmic medicaments containing mercurial preservatives.

Multiple-dose containers can also be used, if desired, particularly since the relatively low viscosities of the aqueous suspensions of the present disclosure permit constant, accurate dosages to be administered dropwise to the eye many times a day as desired. When a preservative needs to be included in the suspension, chlorobutanol, Polyquat, benzalkonium chloride, cetyl-bromide, etc. may be used as a suitable preservative.

Additives which are desirably included in the topical formulation include sodium chloride, EDTA (disodium edetate), surfactants, and preservatives like BAK (benzalkonium chloride). Administration of the formulation to the eye will typically be carried out 1-4 times a day, depending on the particular symptom being treated.

Formulations for ocular injection fall into two classes. For subconjunctival injection, the formulation should generally contain 0.0001-1 wt %, specifically 0.001-0.1 wt %, of therapeutic agent. Any suitable carrier may be used. Specifically, a polymeric carrier such as dextran or polysorbate 80 may be used. Other additives which desirably may be included in the formulation are disodium edetate, sodium bisulfite and sodium sulfite. The formulation should include phosphate-buffered saline, citrate-buffered saline, chondroitin sulfate or a polymeric carrier such as sodium hyaluronate (or hyaluronic acid), purified polyacrylamide or polysorbate 80. Other additives which are desirably included in the intraocularly injectable formulation are sodium chloride, sodium hydroxide and hydrogen chloride, where sodium hydroxide and hydrogen chloride are used for adjustment of pH. Typically, the formulation contains 0.001-1 wt %, specifically 0.01-1.0 wt %, of the drug.

When the active compound or prodrug is substantially in solution state, it is rapidly available to exert its therapeutic function and therefore a lower concentration may be administered to achieve an effective level without causing tissue intolerance. When the active compound or prodrug is substantially in suspension state, a higher concentration may be administered to achieve a sustained effective level without causing tissue tolerance. Hence, when a solution is used, a lower concentration is used to avoid local tissue damage. When a suspension is used, a higher concentration is used because a smaller dissolved amount is introduced for immediate activity.

The dosage and effective amount to obtain desired effective concentration for treatment of particular indications in particular individuals can be obtained readily by following the desired clinical end-point and adjusting the dosing regimen appropriately. For example, in the case of midodrine non-systemically administered to the eye, the bioavailability of the compound is less susceptible to the systemic effect. Consequently, the adjustment of daily administration dosage can be varied without less potential effect on the organs that interfere with drug bioavailability, such as the liver, intestine and kidney.

The inventors of the present disclosure have developed a therapeutic agent capable of preventing and treating diabetic cataract using midodrine since midodrine inhibits the expression of aldose reductase, which is responsible for biosynthesis of sorbitol that plays the most role in the onset of diabetic cataract, and allows a metabolic pathway of hexokinase→glycolysis→TCA (tricarboxylic acid) cycle-→electron transport chain→ATP production instead of direct synthesis of sorbitol from glucose.

When the composition of the present disclosure is a pharmaceutical composition, the pharmaceutical composition may contain a pharmaceutically acceptable carrier in addition to midodrine. The pharmaceutically acceptable carrier may be one commonly used in drug preparation and may include lactose, dextrose, sucrose, acacia gum, calcium phosphate, alginate, sorbitol, mannitol, starch, gelatin, polyvinylpyrrolidone, cellulose, calcium silicate, microcrystalline cellulose, water, syrup, methyl cellulose, methyl hydroxybenzoate, propyl hydroxybenzoate, talc, magnesium stearate, mineral oil, calcium silicate, microcrystalline cellulose, etc., although not being limited thereto. In addition, the pharmaceutical composition may further contain a sweetener, a lubricant, a wetting agent, a flavorant, an emulsifier, a suspending agent, a preservative, etc. as an additive.

A therapeutically effective amount of the pharmaceutical composition of the present disclosure may be administered orally or parenterally rather than being injected directly into the eye.

The administration method of the pharmaceutical composition is determined depending on the severity of a symptom. In general, topical administration is recommended. In addition, the administration dosage of the active ingredient in the pharmaceutical composition may vary depending on the severity of a disease, the age, sex and body weight of a patient, administration route, etc., and the administration may be made once to several times a day.

The pharmaceutical composition may be administered to a mammal such as mouse, rat, livestock, human, etc. via various routes. All modes of administration may be expected. For example, it may be administered orally, intravenously, intramuscularly, subcutaneously, intrauterinarly, rectally or intracerebrovascularly.

The pharmaceutical composition may be prepared as a single-dosage or multi-dosage form using a pharmaceutically acceptable carrier and excipient. It may be formulated into a solution, a suspension, an emulsion, an elixir, a granule, a tablet, a plaster, an extract, a powder, a lotion, an ointment, etc.

The composition of the present disclosure may be prepared into an oral formulation containing the active ingredient, such as a tablet, a troche, a lozenge, a water-soluble or oily suspension, a powder, a granule, an emulsion, a hard or soft capsule, a syrup or an elixir. For preparation into a formulation such as a tablet, a capsule, etc., a binder such as lactose, sorbitol, saccharose, mannitol, starch, amylopectin, cellulose or gelatin, an excipient such as dicalcium phosphate, a disintegrant such as corn starch or sweet potato starch or a lubricant such as magnesium stearate, calcium stearate, sodium stearyl fumarate or polyethylene glycol wax may be included. A capsule formulation may further contain a liquid carrier such as fatty oil.

The composition of the present disclosure may be prepared into a parenteral formulation containing the active ingredient, such as an injection for subcutaneous, intravenous or intramuscular injection, a suppository, or an aerosol that can be inhaled via the respiratory organ through spraying. For preparation of an injection formulation, the composition of the present disclosure may be prepared into a solution or a suspension by mixing with a stabilizer or a buffer in water and may be contained in an ampoule or a vial. A formulation for spraying such as an aerosol may be prepared by mixing with an additive such as a propellant for dispersion of a water-dispersed concentrate or a wet powder.

The pharmaceutical composition of the present disclosure is administered with a pharmaceutically effective amount. In the present disclosure, the "pharmaceutically effective amount" refers to an amount sufficient to treat a disease at a reasonable benefit/risk ratio applicable to medical treatment. An effective dose level may be determined depending on a variety of factors including the type and severity of the disease, drug activity, drug sensitivity, administration time, administration route, excretion rate, treatment period, co-administered drugs and other factors well known in the medical field. The pharmaceutical composition of the present disclosure may be administered alone or in combination with other therapeutic agents. The co-administration of the pharmaceutical composition of the present invention with an existing therapeutic agent may be carried out sequentially or simultaneously. Single or multiple dosages are possible. It is important to use the composition in the minimum possible amount sufficient to obtain the greatest therapeutic effect without side effects, considering all the factors described above.

Specifically, an effective amount of the pharmaceutical composition of the present disclosure can vary depending on the age, sex, physical condition and body weight of a patient, the absorptivity of the active ingredient in the body, deactivation rate, excretion rate, disease type and co-administered drugs. In general, a dosage of 0.001-150 mg, specifically 0.01-100 mg, more specifically 0.01-50 mg, further more specifically 0.11-10 mg, most specifically 0.01-5.0 mg, per kg body weight may be administered once to 3 times a day. However, since the dosage can be increased or decreased depending on administration route, disease severity, sex, body weight, age, etc., the administration dosage does not limit the scope of the present disclosure in any way.

The composition of the present disclosure can be used for the treatment and/or prevention of diabetic cataract either alone or in combination with surgery, hormone therapy, chemotherapy or a biological response modifier.

In another aspect, the present disclosure provides a food composition for preventing or improving diabetic cataract, which contains midodrine or a pharmaceutically acceptable salt thereof as an active ingredient.

In the present disclosure, the "improvement" refers to any effect which improves vision by making the lens transparent by reducing cloudiness and hardening that have occurred in the lens of the eye.

In the present disclosure, the food composition refers to a food prepared by adding the midodrine of the present disclosure or a pharmaceutically acceptable salt thereof to a food material such as drink, tea, flavor, gum, confectionery, etc. or preparing into a capsule, a powder, a suspension, etc., which provides specific health benefit but has no side reaction that may occur when ingested for a long period of time because it is prepared from a food material unlike drugs. The food composition of the present disclosure is very useful because it can be ingested routinely.

The food composition according to the present disclosure includes all food types such as beverages, meat, chocolate, confectionery, pizza, ramen, other noodles, gums, ice creams, alcoholic beverages, vitamin complexes, etc. It can be added in an amount not negatively affecting the inherent taste of the food, usually in a range from 0.01 to 50 wt %, specifically from 0.01 to 20 wt %. For a food in the form of a granule, a tablet or a capsule, it can be added in a range usually from 0.01 to 100 wt %, specifically from 5 to 100 wt %.

In the present disclosure, the food composition may further contain a sitologically acceptable food additive.

A functional food of the present disclosure may contain various flavorants, natural carbohydrates, etc. as additional ingredients. The natural carbohydrate may be a monosaccharide such as glucose or fructose, a disaccharide such as maltose or sucrose, a polysaccharide such as cyclodextrin, or a sugar alcohol such as xylitol, sorbitol, erythritol, etc. As a sweetener, a natural sweetener such as thaumatin or stevia extract or a synthetic sweetener such as saccharin or aspartame may be used. The content of the natural carbohydrate may be 0.01-0.04 part by weight, specifically about 0.02-0.03 part by weight, based on 100 parts by weight of the functional food of the present disclosure.

Besides, the functional food of the present disclosure may contain various nutrients, vitamins, electrolytes, flavorants, colorants, pectic acid and its salts, alginic acid and its salts, organic acids, protective colloidal thickeners, pH control agents, stabilizers, antiseptics, glycerin, alcohols, carbonating used in carbonated beverages, etc. In addition, the functional food of the present disclosure may contain a pulp for preparing a natural fruit juice, a fruit juice beverage and a vegetable beverage. These ingredients may be used either independently or in combination. The content of these additives is usually selected in a range from 0.01 to 0.1 part by weight based on 100 parts by weight of the functional food of the present disclosure although it is of no great importance.

Mode for Invention

Hereinafter, the present disclosure will be described in more detail through examples. The following examples are provided to illustrate the present disclosure in more detail, and the scope of the present disclosure is not limited by the examples.

EXAMPLE 1

Experimental Animal Model 1-1: Animal Model

For investigation of the onset of cataract in diabetes and the effect of midodrine on the prevention of cataract, a diabetes animal model of rats and a normal control group of rats with comparable age and sex were used. Otsuka Long-Evans Tokushima Fatty (OLETF) rats were used as a diabetes animal model of rats. The OLETF rats are widely used as a type 2 diabetes animal model because fat accumulation and hyperglycemia are induced in the body of the experimental animals and the pathological condition is similar to that of type 2 diabetes in human. Long-Evans Tokushima Otsuka (LETO) rats were used as a normal control group. The OLETF rats were divided into three groups depending on midodrine intake: OLETF, OLETF-M0.3 and OLETF-M1.0. The OLETF group was raised without intake of midodrine, the OLETF-M0.3 group was made to ingest 0.3 mg of midodrine every day per body weight (midodrine 0.3 mg/kg/day), and the OLETF-M1.0 group was made to ingest 1.0 mg of midodrine every day per body weight (midodrine 1.0 mg/kg/day). Midodrine was dissolved in drinking water so that the rats could ingest the corresponding daily dosage.

The experimental animals were divided into four groups: LETO, OLETF, OLETF-M0.3 and OLETF-M1.0, and all the experimental animals were raised for 12 weeks. During the 12 weeks, the OLETF-M0.3 group and the OLETF-M1.0 group were made to ingest midodrine every day.

1-2: Measurement of Blood Sugar Level Change

Onset of cataract in diabetes: The fasting blood sugar level of the experimental animals was measured every week using a blood glucose meter (Roche Accu-Check Active). The fasting blood sugar level of the LETO group during the raising period was 111 mg/dL on average, and there was no significant change in fasting blood sugar level during the raising period (FIG. 1). In contrast, all of the OLETF, OLETF-M0.3 and OLETF-M1.0 groups showed increase in fasting blood sugar level as compared to the LETO group. In particular, the increase in fasting blood sugar level was distinct from week 3 and reached maximum at week 6, showing that diabetes occurred effectively in the OLETF rats. From week 9, the fasting blood sugar level of the OLETF-M1.0 group was decreased slightly as compared to the OLETF group.

1-3: Measurement of Body Weight Change

Figure 2:
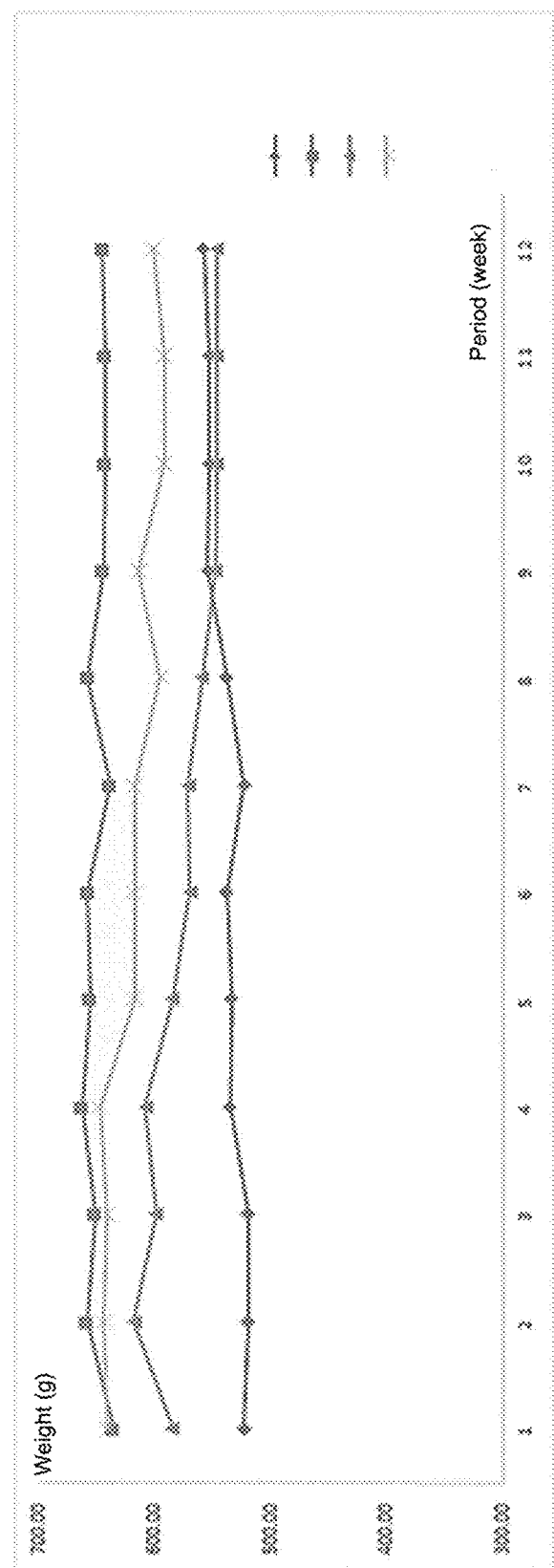
FIG. 2 shows the change in the body weight of a diabetes model experimental animal according to an exemplary embodiment of the present disclosure.

During the raising period, the body weight of the OEFTF group was significantly higher as compared to the LETO group. The OLETF-M0.3 group and the OLETF-M1.0 group showed significantly higher as compared to the LETO group during the initial raising period, but the body weight was decreased slightly with time. In particular, the OLETF-M0.3 group showed no significant difference in body weight when compared with the LETO group from week 9 (FIG. 2).

EXAMPLE 2

Observation of Lens

Cataract can be depending on the part of the lens showing cloudiness. The most common three types are nuclear cataract, cortical cataract and posterior subcapsular cataract.

Figure 3:
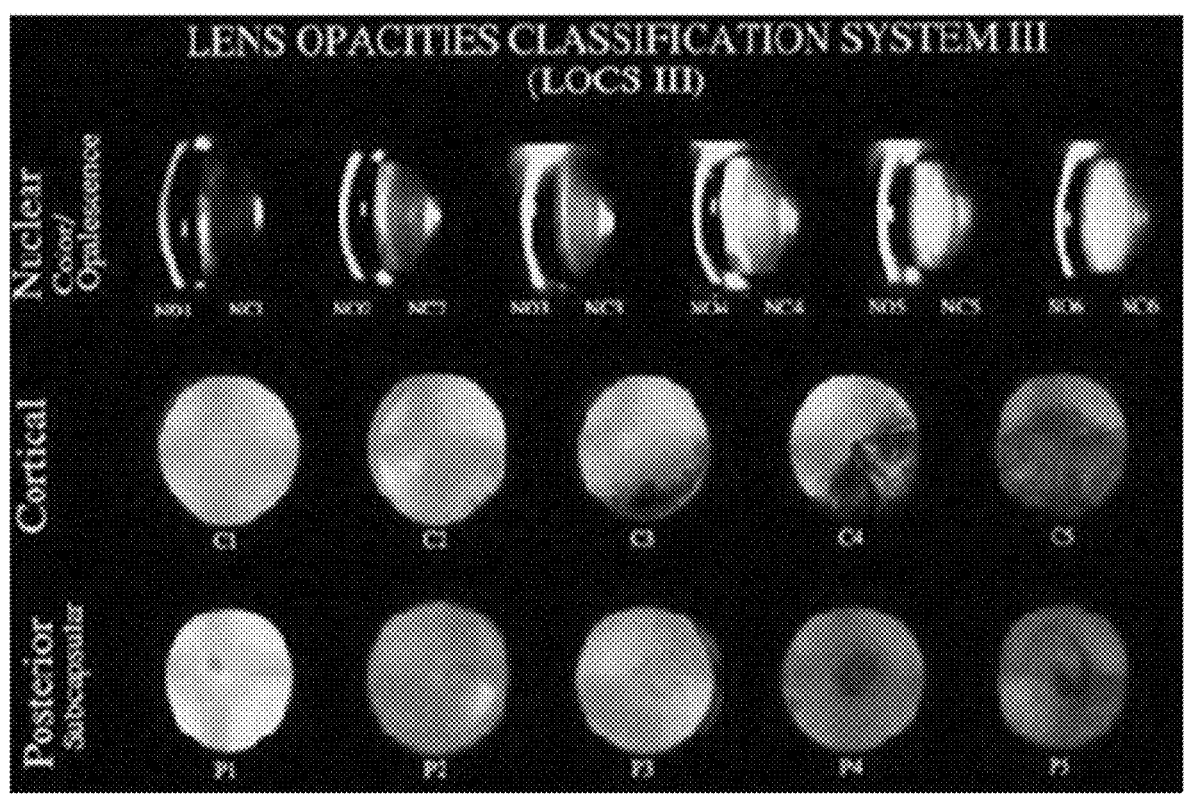
FIG. 3 shows Lens Opacities Classification System (LOCS) III for distinguishing the occurrence and severity of cataract.

Among them, cortical cataract and posterior subcapsular cataract are known to be associated with diabetic cataract. Lens Opacities Classification System (LOCS) III is the most widely used for detection of cataract and determination of its severity, and the diagnosis and classification of cortical cataract and posterior subcapsular cataract are based on lens images imaged by retroillumination (FIG. 3).

After taking the fundus images of the experimental animal, the lens of the experimental animal was imaged by retroillumination using the same portable fundus camera for investigation of the onset of diabetic cataract. From the obtained lens images, cloudiness of C1 (cortical cataract grade), P1 (posterior subcapsular cataract grade) or higher grades in the LOCS III were defined as onset of cataract (FIG. 3).

Figure 4:
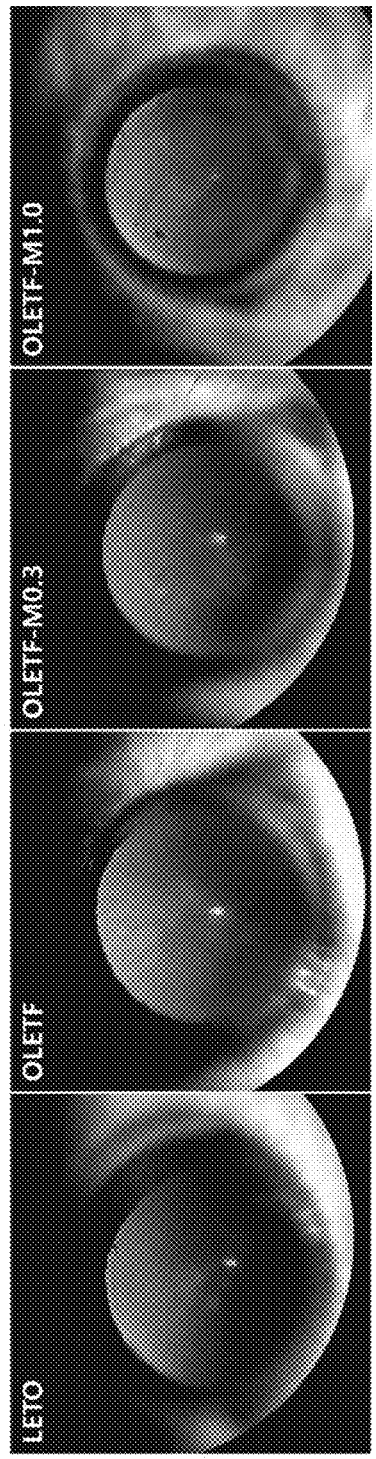
FIG. 4 shows the occurrence of cataract in the lens of a diabetes model experimental animal according to an exemplary embodiment of the present disclosure.

No cataract was observed in the experimental animals of the LETO group. In the OLETF group, cataract was observed in 8 out of 12 eyes. In contrast, cataract was observed in 1 out of 10 eyes in the OLETF-M0.3 group, and in 2 out of 8 eyes in the OLETF-M1.0 group. That is to say, the occurrence of cataract was decreased significantly in the rats that ingested midodrine than in the rats that did not ingest midodrine (FIG. 4).

EXAMPLE 3

Measurement of Lens Transparency

Figure 5:
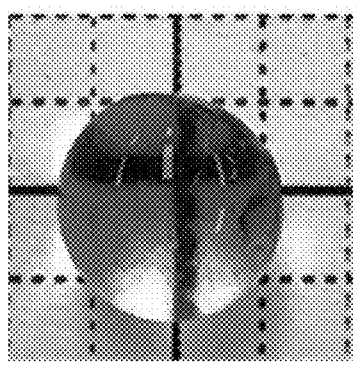
FIG. 5 shows the change in the clarity of a graph paper pattern depending on the lens transparency of a diabetes model experimental animal according to an exemplary embodiment of the present disclosure.
Figure 5:
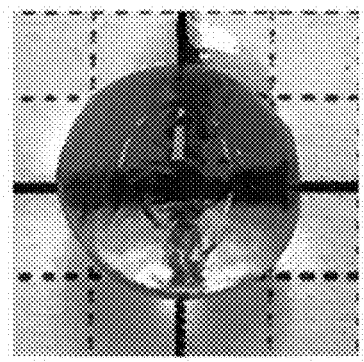
Figure 5:
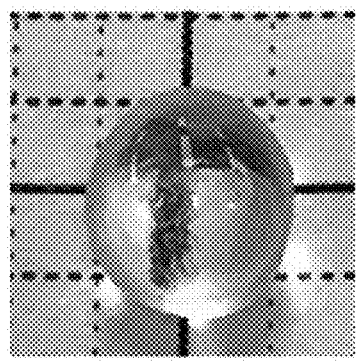

After acquiring the fundus and lens images, all the experimental animals were euthanatized and the lens was imaged after placing on graph paper. The clarity of the graph paper pattern seen through the lens is changed depending on lens transparency. The clarity of the graph paper pattern was evaluated quantitatively using the ImageJ (National Institutes of Health, Bethesda, Md.) program (FIG. 5).

Figure 6:
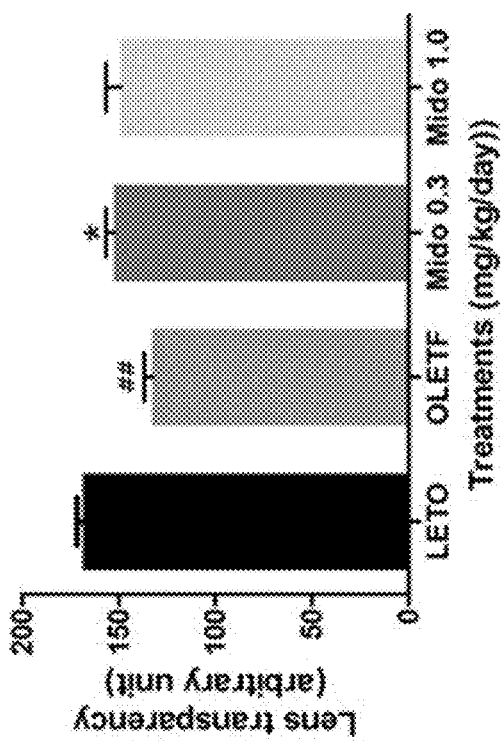
FIG. 6 compares the lens transparency of a diabetes model experimental animal according to an exemplary embodiment of the present disclosure.
Figure 6:
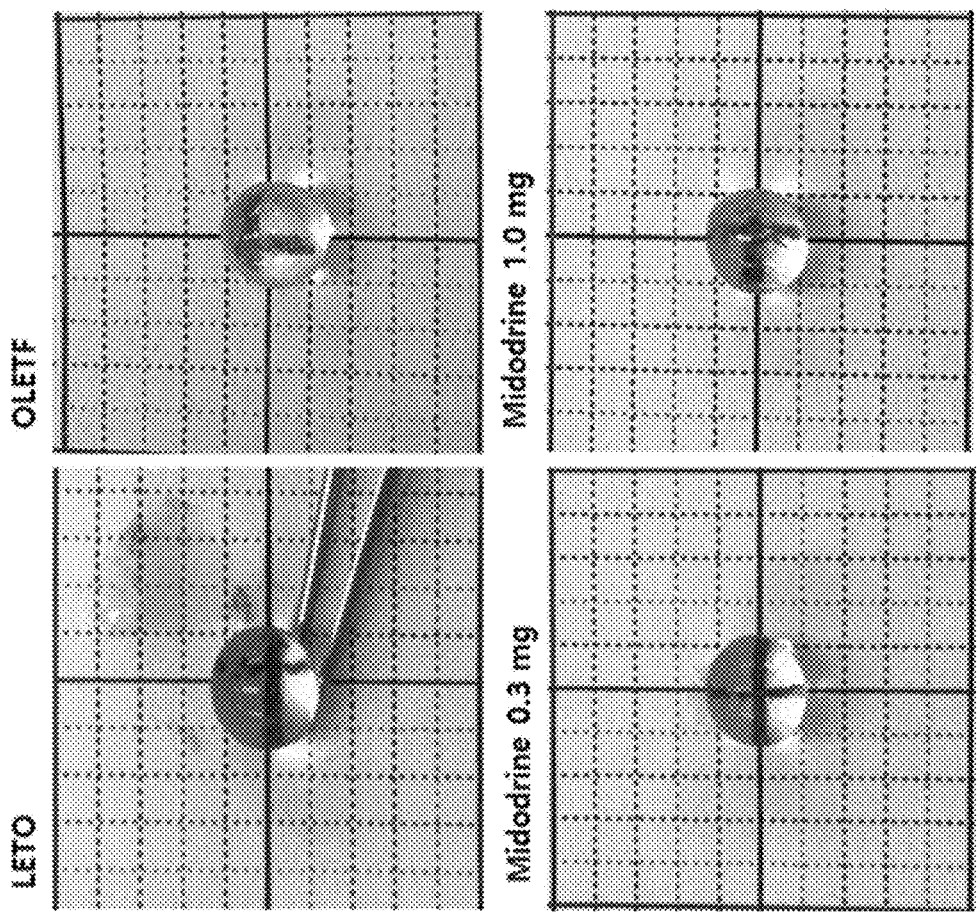

As a result of the lens transparency evaluation, the OLETF group showed significantly decreased lens transparency as compared to the LETO group and the OLETF-M0.3 group, and there was no significant difference in lens transparency between the LETO group and the OLETF-M0.3 group. Accordingly, it was confirmed that the administration of midodrine to a diabetes model of rats can maintain lens transparency as compared to a diabetes model of rats to which midodrine was not administered (FIG. 6).

EXAMPLE 4

Measurement of Aldose Reductase, Hexokinase, AMPK and Adenosine Triphosphate (ATP) in Lens The levels of aldose reductase, hexokinase and ATP in the lens sample were measured with a spectrophotometer (Spectramax Plus 384; Molecular Devices, Sunnyvale, CA, USA) by ELISA assay.

Figure 7:
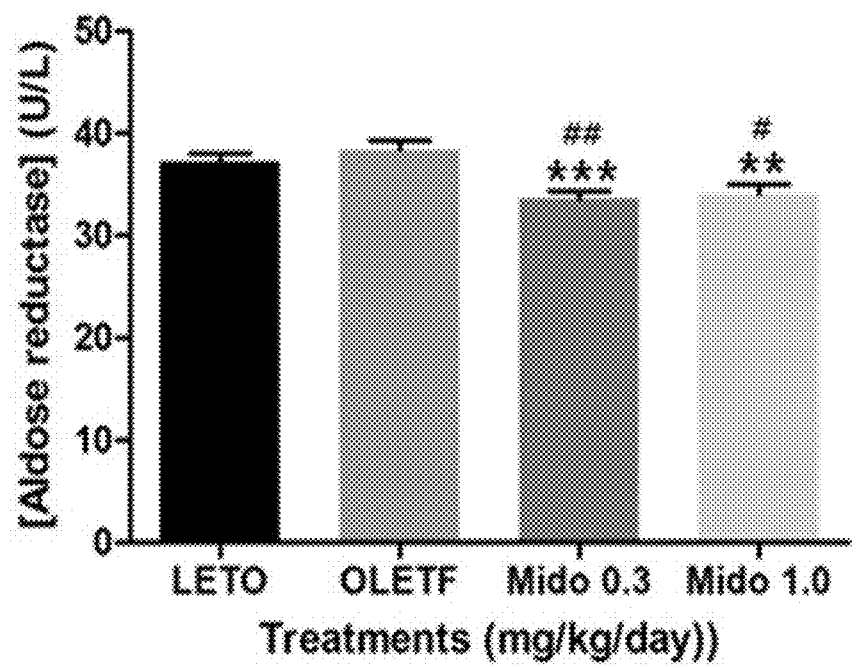
FIG. 7 compares the level of aldose reductase in the lens of a diabetes model experimental animal according to an exemplary embodiment of the present disclosure.

The level of aldose reductase was significantly lower in the OLETF-M0.3 group (33.6±2.6 U/L) and the OLETF-M1.0 group (34.1±2.8 U/L) as compared to the LETO group (37.2±2.8 U/L) and the OLETF group (38.4±3.1 U/L) (FIG. 7). Through this, it was confirmed that the administration of midodrine to a diabetes model of rats significantly reduces the expression of aldose reductase as compared to the normal control group and to a diabetes model of rats to which midodrine was not administered.

Figure 8:
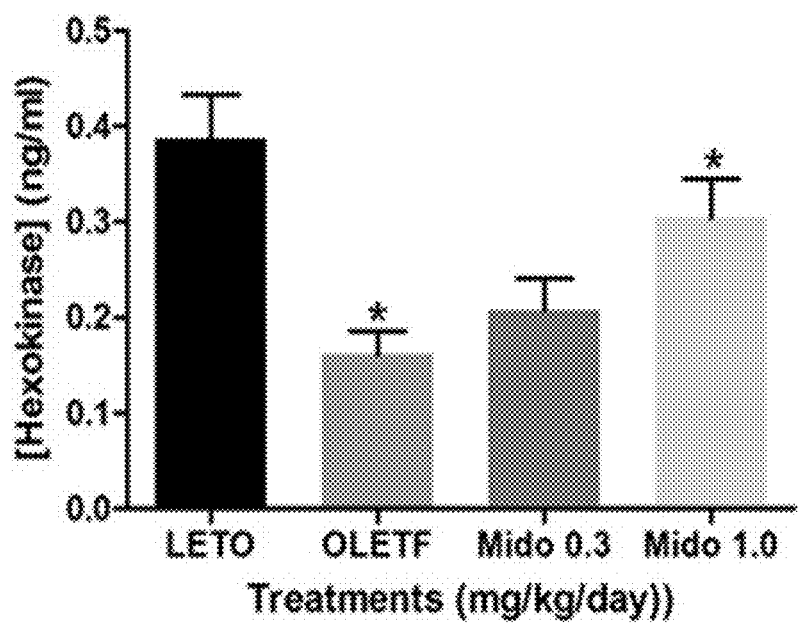
FIG. 8 compares the hexokinase level in the lens of a diabetes model experimental animal according to an exemplary embodiment of the present disclosure.

The level of hexokinase was significantly lower in the OLETF group (0.162±0.042 ng/mL) as compared to the LETO group (0.387±0.0639 ng/mL), but there was no significant difference in the hexokinase level of the OLETF-M0.3 group and the OLETF-M1.0 group as compared to the LETO group (FIG. 8). Through this, it was confirmed that the administration of midodrine to a diabetes model of rats can increase the expression of hexokinase as compared to a diabetes model of rats to which midodrine was not administered.

Figure 9:
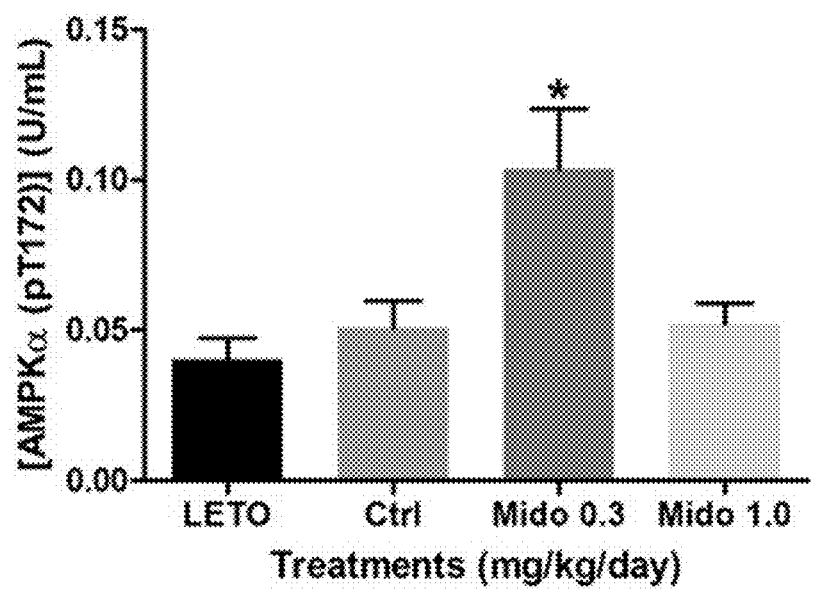
FIG. 9 compares the phosphorylated AMPKα level in the lens of a diabetes model experimental animal according to an exemplary embodiment of the present disclosure.

The level of AMPK (AMP-activated protein kinase) was slightly higher in the OLETF group (0.0509±0.0293 U/mL) as compared to the LETO group (0.0403±0.019 ng/mL), and the OLETF-M0.3 group showed a significantly increased AMPK level as compared to the OLETF group (0.0509±0.0293 U/mL). Through this, it was confirmed that the administration of midodrine to a diabetes model of rats can increase the expression of AMPK as compared to a diabetes model of rats to which midodrine was not administered (FIG. 9).

Figure 10:
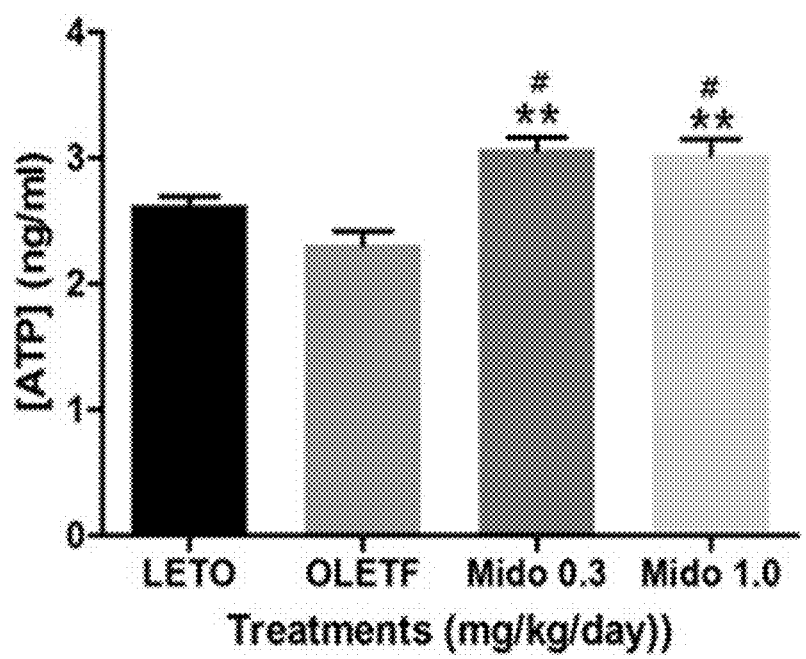
FIG. 10 compares the ATP level in the lens of a diabetes model experimental animal according to an exemplary embodiment of the present disclosure.

The level of ATP was significantly higher in the OLETF-M0.3 group (3.065±0.202 ng/mL) and the OLETF-M1.0 group (3.025±0.299 ng/mL) as compared to the LETO group (2.622±0.146 ng/mL) and the OLETF group (2.307±0.225 ng/mL) (FIG. 10). Through this, it was confirmed that the administration of midodrine to a diabetes model of rats significantly increases the ATP level as compared to the normal control group and a diabetes model of rats to which midodrine was not administered.

Figure 11:
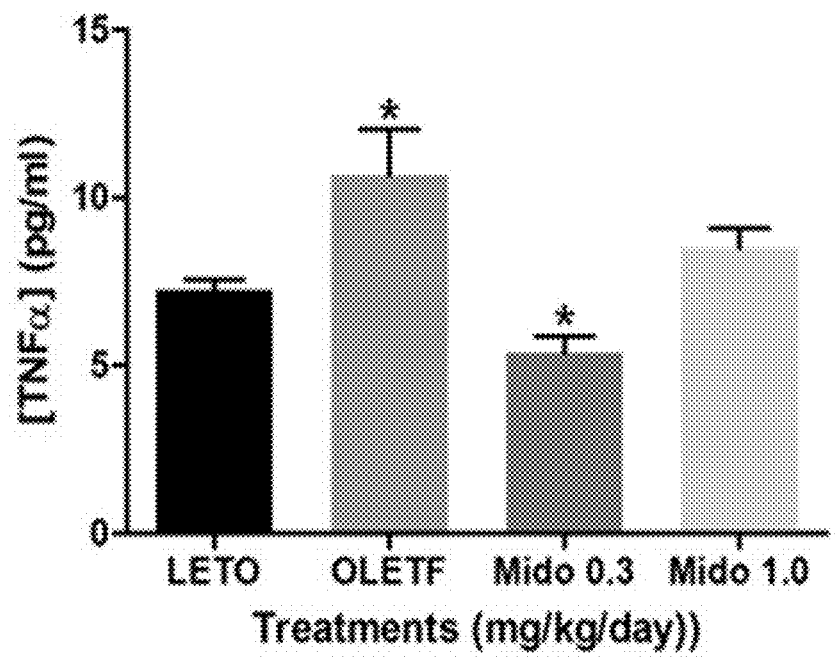
FIG. 11 compares the TNFα level in the lens of a diabetes model experimental animal according to an exemplary embodiment of the present disclosure.

The level of the inflammatory cytokine TNFα in blood (plasma) was significantly higher in the OLETF group (10.667±2.732 pg/mL) as compared to the LETO group (7.23±0.722 pg/mL), and the OLETF-M0.3 group (5.383±0.984) showed a significantly decreased TNFα level as compared to the OLETF group (FIG. 11). Through this, it was confirmed that the administration of midodrine to a diabetes model of rats can decrease the expression of TNFα as compared to a diabetes model of rats to which midodrine was not administered.

The occurrence of cortical cataract and posterior subcapsular cataract was significantly decreased in a type 2 diabetes model of rats administered with the $\alpha_1$-adrenergic receptor agonist, midodrine, for 14 weeks as compared to a type 2 diabetes model of rats not administered with midodrine. In addition, the lens transparency was maintained throughout the experimental period.

Figure 12:
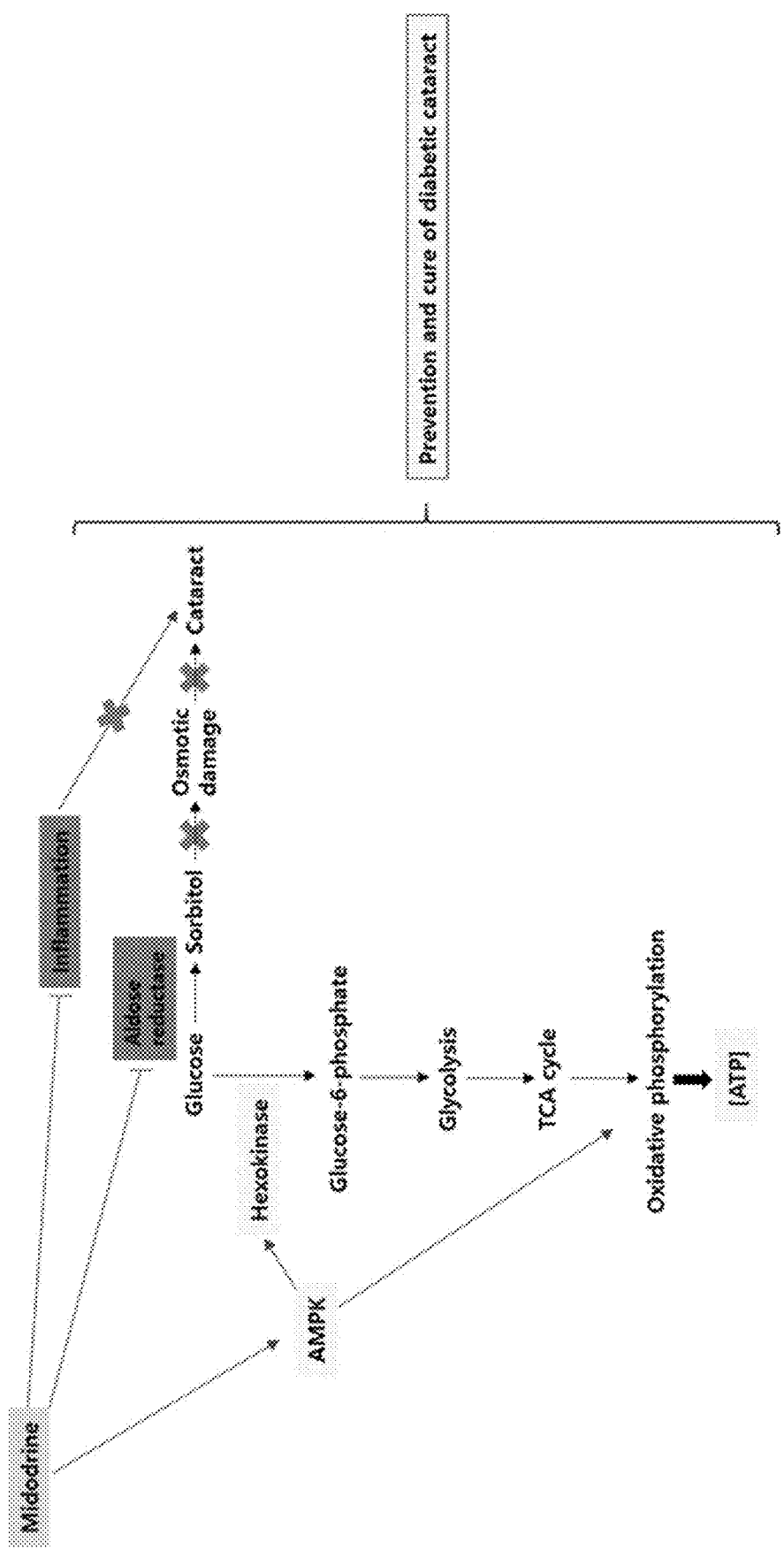
FIG. 12 schematically shows the mechanism of prevention and/or treatment of cataract by midodrine according to the present disclosure.

In an experiment conducted to investigate the inhibition of the onset of cataract by midodrine, the expression of aldose reductase, which is responsible for biosynthesis of sorbitol that plays the most role in the onset of diabetic cataract, was significantly decreased in a type 2 diabetes model of rats administered with midodrine. In addition, the intake of midodrine increased the expression of hexokinase, which degrades glucose via a normal metabolic pathway, and, therefore, also significantly increased ATP production. Through this, it can be seen that midodrine prevents the conversion of glucose to sorbitol by inhibiting the expression of aldose reductase and, therefore, prevents the onset of cataract resulting from the accumulation of sorbitol in the lens. In addition, it can be inferred that midodrine can prevent and treat diabetic cataract by increasing the expression of hexokinase and AMPK, which are necessary for normal glucose breakdown and ATP production. Furthermore, midodrine can alleviate diabetic cataract by decreasing the expression of the inflammatory cytokine, TNFα, which is known to affect the onset and development of diabetes cataract (FIG. 12).

The invention claimed is:

1. A method for treating diabetic cataract, comprising:
   administering a pharmaceutical composition comprising midodrine or a pharmaceutically acceptable salt thereof as an active ingredient to a subject;
   measuring expression levels of aldose reductase and TNFα in a cell of the subject before the administering and after the administering; and
   confirming that the expression levels after the administering are decreased from the expression levels before the administering.

2. The method of claim 1, wherein the pharmaceutical composition comprises an ophthalmologically effective amount of the midodrine or the pharmaceutically acceptable salt thereof and an ophthalmologically acceptable pharmaceutical carrier.

3. The method of claim 2, wherein the ophthalmologically effective amount is 0.01-5.0 mg/kg/day.

4. The method of claim 2, wherein the ophthalmologically acceptable pharmaceutical carrier is an ophthalmologically acceptable buffered saline solution, a liposome or a biodegradable synthetic polymer.

5. A method for treating diabetic cataract, comprising:
   administering a pharmaceutical composition comprising midodrine or a pharmaceutically acceptable salt thereof as an active ingredient to a subject; and
   measuring expression level of hexokinase in a cell of the subject before the administering and after the administering; and
   confirming the expression levels after the administering are increased from the expression levels before the administering.

6. The method of claim 5, wherein the pharmaceutical composition comprises an ophthalmologically effective amount of the midodrine or the pharmaceutically acceptable salt thereof and an ophthalmologically acceptable pharmaceutical carrier.

7. The method of claim 6, wherein the ophthalmologically effective amount is 0.01-5.0 mg/kg/day.

8. The method of claim 6, wherein the ophthalmologically acceptable pharmaceutical carrier is an ophthalmologically acceptable buffered saline solution, a liposome or a biodegradable synthetic polymer.

9. A method for treating diabetic cataract, comprising:
   administering a pharmaceutical composition comprising midodrine or a pharmaceutically acceptable salt thereof as an active ingredient to a subject; and
   measuring ATP concentration in a cell of the subject before the administering and after the administering; and
   confirming that the ATP concentration after the administering is increased from the ATP concentration before the administering.

10. The method of claim 9, wherein the pharmaceutical composition comprises an ophthalmologically effective amount of the midodrine or the pharmaceutically acceptable salt thereof and an ophthalmologically acceptable pharmaceutical carrier.

11. The method of claim 10, wherein the ophthalmologically effective amount is 0.01-5.0 mg/kg/day.

12. The method of claim 10, wherein the ophthalmologically acceptable pharmaceutical carrier is an ophthalmologically acceptable buffered saline solution, a liposome or a biodegradable synthetic polymer.

* * * * *